(12) United States Patent
Asada

(10) Patent No.: US 8,768,508 B2
(45) Date of Patent: Jul. 1, 2014

(54) ROBOT-POSITION DETECTING DEVICE AND ROBOT SYSTEM

(75) Inventor: Atsushi Asada, Suwa (JP)

(73) Assignee: Seiko Epson Corporation (JP)

( * ) Notice: Subject to any disclaimer, the term of this patent is extended or adjusted under 35 U.S.C. 154(b) by 90 days.

(21) Appl. No.: 13/371,810

(22) Filed: Feb. 13, 2012

(65) Prior Publication Data

US 2012/0226382 A1  Sep. 6, 2012

(30) Foreign Application Priority Data

Mar. 4, 2011  (JP) .................................. 2011-047863

(51) Int. Cl.
*G06F 19/00* (2011.01)

(52) U.S. Cl.
USPC .......................................... 700/245; 700/259

(58) Field of Classification Search
USPC ..................................... 700/245, 259; 701/408
See application file for complete search history.

(56) References Cited

U.S. PATENT DOCUMENTS

| | | | | |
|---|---|---|---|---|
| 8,326,460 B2 * | 12/2012 | Ban et al. ....................... | 700/259 |
| 2008/0077326 A1 * | 3/2008 | Funk et al. ..................... | 701/220 |
| 2008/0317575 A1 | 12/2008 | Yamazaki et al. | |
| 2009/0177302 A1 * | 7/2009 | Kondo et al. .................... | 700/94 |
| 2009/0259340 A1 * | 10/2009 | Umemoto et al. ............. | 700/275 |
| 2010/0121572 A1 * | 5/2010 | Berardi et al. ................. | 701/216 |
| 2010/0152896 A1 | 6/2010 | Komatsu et al. | |
| 2011/0060522 A1 * | 3/2011 | Oh et al. ......................... | 701/217 |
| 2011/0201007 A1 | 8/2011 | Waller et al. | |
| 2013/0151042 A1 * | 6/2013 | Kim et al. ........................ | 701/22 |
| 2013/0166198 A1 * | 6/2013 | Funk et al. ..................... | 701/446 |

FOREIGN PATENT DOCUMENTS

| CN | 102189548 A | | 9/2011 |
|---|---|---|---|
| JP | 2008183690 A | * | 8/2008 |
| JP | 4539685 | | 7/2010 |

* cited by examiner

*Primary Examiner* — Khoi Tran
*Assistant Examiner* — Robert Nguyen
(74) *Attorney, Agent, or Firm* — Harness, Dickey & Pierce, P.L.C.

(57) ABSTRACT

A robot-position detecting device includes: a position-data acquiring unit that acquires position data indicating actual positions of a robot; a position-data input unit that receives the position data output from the position-data acquiring unit; and a position calculating unit that calculates a computational position of the robot through linear interpolation using first and second position data input to the position-data input unit at different times.

8 Claims, 6 Drawing Sheets

ROBOT-POSITION DETECTING DEVICE AND ROBOT SYSTEM

BACKGROUND

1. Technical Field

The present invention relates to a robot-position detecting device that detects the position of a robot and a robot system including the robot-position detecting device.

2. Related Art

There are known methods for correcting a target position of a robot that grips a workpiece. For example, in Japanese Patent No. 4539685, an image pickup apparatus, which picks up an image of a workpiece, and a robot are respectively moved to predetermined positions such that the workpiece gripped by a robot and a reference mark provided in the robot are arranged in an image pickup area of the image pickup apparatus. The image picked up by the image pickup apparatus is subjected to image processing, whereby a center coordinate, a tilt, and the like of the workpiece with respect to the reference mark are acquired. A position correction amount concerning a target position of the robot is calculated on the basis of the acquired center coordinate and the like.

In the method disclosed in Japanese Patent No. 4539685, it is possible to accurately calculate the position correction amount concerning the target position of the robot. However, the robot needs to be stopped when the image for calculating the position correction amount is picked up. Since the robot is stopped to calculate the position correction amount in a predetermined position, the throughput of the apparatus decreases by an amount equivalent to the time in which the robot is stopped. To suppress such a decrease in the throughput, it is desirable to pick up an image of a moving a workpiece without stopping the robot and to acquire the position correction amount of the robot on the basis of the position of the robot at the time of the image pickup and the picked-up image of the workpiece.

On the other hand, data from an encoder indicating the position of the robot is usually input to a robot controller through serial communication. Therefore, the data is input to the robot controller at a time that is later than a time of the output of the data by a communication time between the encoder and the robot controller corresponding to a communication period, a data amount, and the like of the serial communication. When the data is input, if the robot is constantly moving as explained above, a position calculated based on the encoder and a position obtained from the image are different from each other on a time axis.

SUMMARY

An advantage of some aspects of the invention is to provide a robot-position detecting device and a robot system that can improve the accuracy of the position of a moving robot.

An aspect of the invention is directed to a robot-position detecting device including: a position-data input unit to which position data indicating the position of a robot is input from an encoder; and a position calculating unit that acquires the input position data and calculates the position of the robot. The position calculating unit receives a command for detecting the position of the robot, calculates, using first position data acquired at a first timing earlier than the command, second position data acquired at a second timing later than the command, and a communication time required for communication between the encoder and the position-data input unit, a position at a timing later than a timing of the input of the command by the communication time through linear interpolation of the first position data and the second position data, and outputs a result of the calculation as the position of the robot at the time the command is input.

With the robot-position detecting device, the position of the robot is output by the linear interpolation on the basis of the timing later than the timing of the input of the command by the communication time required for the communication between the encoder and the position-data input unit. Therefore, timings of data used in the linear interpolation are substantially equal timings on a time axis. Therefore, the position of the robot calculated by the linear interpolation using the first position data and the second position data is a position obtained by correcting a moving distance of the robot using the communication time. Consequently, it is possible to accurately detect the position of the moving robot.

The robot-position detecting device may be configured such that the position calculating unit includes a command detecting unit that detects the command at a period Ts shorter than a predetermined period T for acquiring the position data input to the position-data input unit from one encoder.

With the robot-position detecting device described above, the times when the command can be detected are more than the times when position data are input from the one encoder. As a result, it is possible to detect the position of the robot at time closer to the timing of the input of the command.

The robot-position detecting device may be configured such that the position calculating unit acquires position data from different encoders at periods T/n obtained by equally dividing the predetermined period T by an integer n equal to or larger than 1 and outputs, for each of the encoders, the position of the robot at the time the command is input.

With the robot-position detecting device described above, the position of the robot is calculated for each of the different encoders. Therefore, it is possible to more accurately detect the position of the robot at the time the command is input.

The robot-position detecting device may be configured such that the position calculating unit determines whether the acquired position data is normal, and when the position calculating unit determines that the position data immediately before the detection of the command is not normal, the position calculating unit uses, as the first data, position data acquired immediately before the not normal position data was acquired.

Since the position data input from the encoder is an electric signal, it is likely that the position data is affected by noise or the like. If the position of the robot is calculated using position data affected by noise or the like, the reliability of the position of the robot calculated by the position calculating unit is deteriorated. In this regard, with the robot-position detecting device having the configuration explained above, the position calculating unit determines whether the acquired position data is normal and, when it is determined that the position data immediately before the detection of the command is not normal, the position calculating unit uses, as the first position data, position data acquired immediately before the not normal position data was acquired. Therefore, it is possible to calculate the position of the robot using normal position data.

The robot-position detecting device may be configured such that, when the position calculating unit determines that the position data immediately after the detection of the command is not normal, the position calculating unit uses, as the second position data, position data acquired immediately after the not normal position data was acquired.

Usually, as the first timing and the second timing are temporally far apart from each other, the linearity in positions between the timings is further lost. In the robot-position detecting device, since linear interpolation is used, as the first timing and the second timing are temporally far apart from each other, a larger error can occur between the position of the robot calculated by the position calculating unit and the actual position of the robot. In this regard, with the configuration explained above, for example, when a timing of the input of the position data, which is a timing immediately after the detection of the command, is set as a reference timing, even if the first timing and the second timing are temporally furthest apart from each other, the first position data is position data input at a timing immediately preceding the reference timing and the second position data is position data input at a timing immediately following the reference timing. As a result, it is possible to improve the accuracy of a calculated position of the robot as compared with calculating the position of the robot on the basis of position data acquired earlier than the first timing and position data acquired later than the second timing.

Another aspect of the invention is directed to a robot system including: a robot that conveys a workpiece; an encoder that outputs position data indicating the position of the robot; a command output unit that outputs a command for detecting the position of the robot; and a robot-position detecting unit that receives the input of the position data and the command and detects, on the basis of the position data, the position of the robot at the time the command is input. The robot-position detecting unit is the robot-position detecting device.

With the robot system according to this aspect of the invention, even if the command output unit outputs a command during movement of the robot, it is possible to accurately detect the position of the robot.

The robot system may further include: a camera that picks up, at a time when the command is input from the command output unit, an image of a predetermined image pickup range that includes the workpiece as it is being moved by the robot; a workpiece-position acquiring unit that acquires the position of the workpiece on the basis of the image acquired by the camera; and a target-position correcting unit that corrects the target position on the basis of the position of the workpiece acquired by the workpiece-position acquiring unit and the position of the robot detected by the robot-position detecting unit.

With the robot system described above, it is possible to correct the target position of the robot on the basis of a relative position of the position of the robot and the position of the workpiece at the timing when the command is input from the command output unit. As explained above, the position of the robot detected by the robot-position detecting unit is a position detected while the robot is being moved. As such, the accuracy of the position determination is improved. In other words, it is unnecessary to stop the robot in order to correct the target position. It is also possible to improve the accuracy of a correction amount for the target position of the robot. As a result, it is possible to convey, while suppressing a decrease in the throughput of the robot system, the workpiece to a position to where the workpiece should be conveyed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot-position detecting device and a robot system according to an embodiment of the invention are explained below with reference to FIGS. 1 to 8. First, a schematic configuration of the robot system according to the embodiment is explained with reference to FIGS. 1 and 2.

Figure 1:
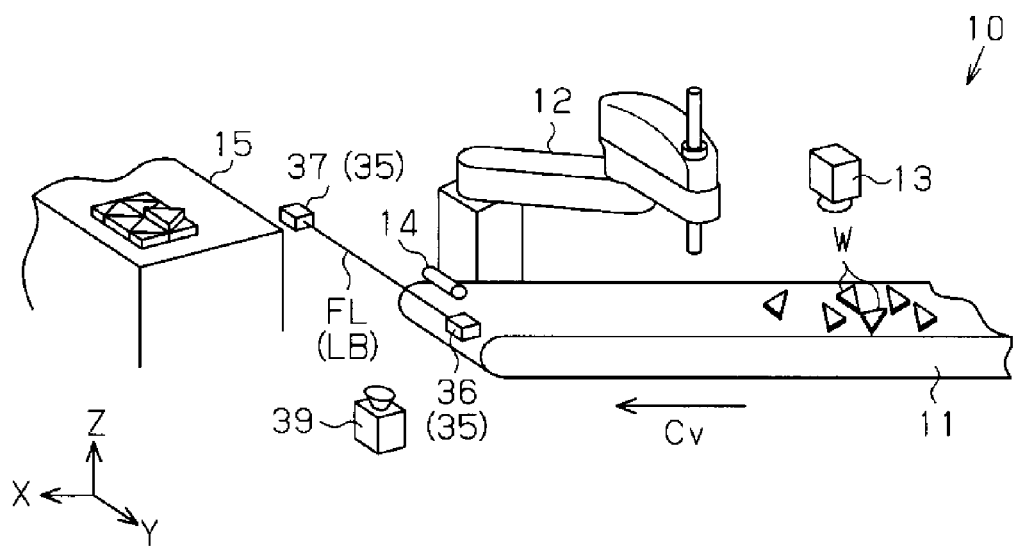
FIG. 1 is a perspective view showing a schematic configuration of a robot system according to an embodiment of the invention.

As shown in FIG. 1, in a robot system 10, on a side of a conveyor 11 that conveys a workpiece W along a conveying direction Cv at predetermined conveying speed, a robot 12 of a horizontal multi-joint type that selectively grips the workpiece W conveyed by the conveyor 11 and performs predetermined work is arranged. A camera 13 is set on an upstream side of the robot 12 in the conveying direction Cv. The camera 13 picks up, from above, an image of the workpiece W conveyed on the conveyor 11. In the robot system 10, the workpiece W is selected as a workpiece target on the basis of the image picked up by the camera 13. The position of the workpiece W selected as the workpiece target is obtained on the basis of the image and an encoder 14 that measures a conveyance amount of the conveyor 11. The workpiece W selected as the workpiece target is carried to a predetermined position on a workbench 15 located in a movable range of the robot 12. To accomplish this, the workpiece W is lifted to predetermined height by the robot 12.

Figure 2:
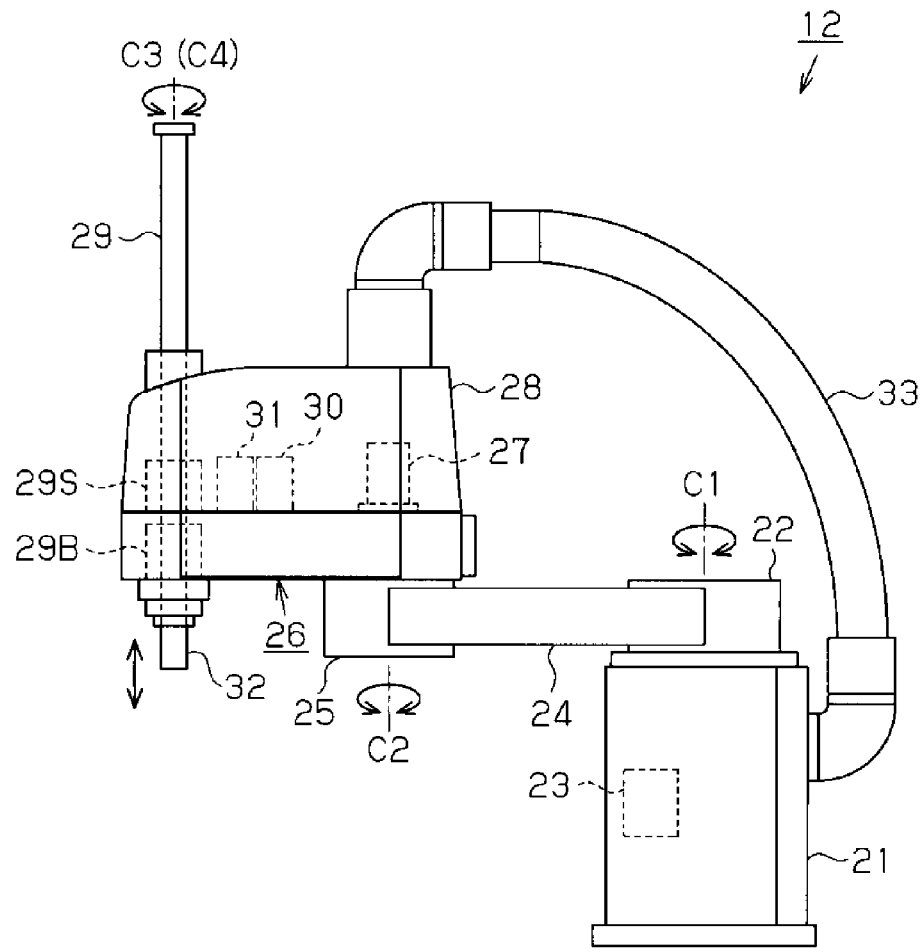
FIG. 2 is a front view showing a front structure of a robot.

As shown in FIG. 2, in the robot 12, a base shaft 22 that is pivotable with respect to a base 21 about a control axis C1 extending along the vertical direction is provided at the upper end of the base 21 set on a floor surface or the like. A first motor 23 provided in the base 21 is forwardly and reversely rotated, whereby the base shaft 22 pivots about the control axis C1.

The proximal end of a first horizontal arm 24 extending in the horizontal direction is coupled and fixed to the base shaft 22. A supporting shaft 25 is coupled and fixed to the distal end of the first horizontal arm 24. The supporting shaft 25 supports a second horizontal arm 26 to be pivotable with respect to the supporting shaft 25 about a control axis C2 extending along the vertical direction.

A second motor 27 is disposed at the proximal end of the second horizontal arm 26. The second motor 27 forwardly and reversely rotates to thereby receive reaction from the supporting shaft 25. The second horizontal arm 26 pivots, with the reaction, in the horizontal direction with respect to the first horizontal arm 24 about the control axis C2.

An up-down rotating shaft 29 that pierces through the second horizontal arm 26 is provided at the distal end of the second horizontal arm 26. The up-down rotating shaft 29 is supported to be rotatable with respect to the second horizontal arm 26 and movable in the up and down directions. A hoisting motor 30 provided in the second horizontal arm 26 is forwardly and reversely rotated, whereby the up-down rotating shaft 29 is lifted and lowered along a control axis C3 extending in the vertical direction. A rotation motor 31 provided in the second horizontal arm 26 is forwardly and reversely rotated, whereby the up-down rotating shaft 29 is forwardly and reversely rotated about a control axis C4 thereof extending along the vertical direction. A tool such as a hand that grips an object to be conveyed or a hand that machines an object to be machined can be attached to a workpiece section 32 of the up-down rotating shaft 29.

A detection sensor 35 that detects that the workpiece W passes a detection line FL is provided in a conveying path for the workpiece W conveyed to the workbench 15. The detection sensor 35 includes a light emitting unit 36 that emits detection light LB, which is formed by a laser beam having high directivity and convergence, along the horizontal direction and a light receiving unit 37 that receives the detection light LB emitted from the light emitting unit 36. The light emitting unit 36 and the light receiving unit 37 are set to hold the movable range of the robot 12 between the units and such that the detection light LB is temporarily blocked by the workpiece W conveyed from the conveyor 11 to the workbench 15.

A camera 39 that picks up an image of the workpiece W from below at the same time as the detection of the workpiece W by the detection sensor 35 is provided on the lower side of the detection sensor 35. In the robot system 10, a relative position of the workpiece W with respect to the robot 12 is obtained on the basis of the image picked up by the camera 39 and the position of the robot 12 at the time of the image pickup. A target position of the robot 12 is corrected to convey the workpiece W to a predetermined position set in advance.

A system configuration of the robot system 10 having the configuration explained above is explained with reference to FIGS. 3 to 8.

Figure 3:
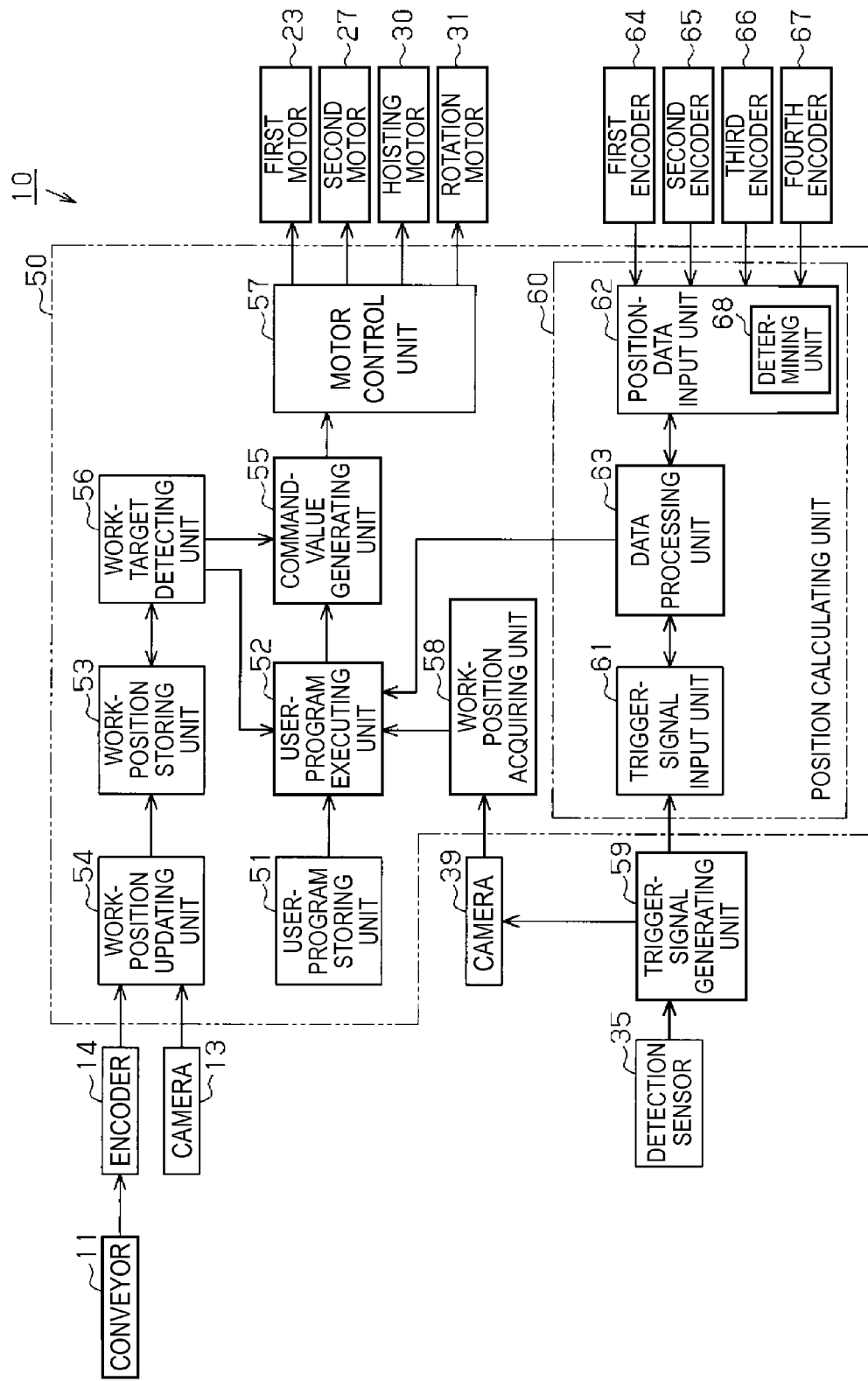
FIG. 3 is a functional block diagram showing a system configuration of a robot system.

As shown in FIG. 3, the robot system 10 is collectively controlled by the controller 50. The controller 50 is a control device that controls to drive the robot 12. The controller 50 controls a positioning action of the robot 12 to move to the target position and controls a tracking action of the robot 12 to track the workpiece W moving on the conveyor 11.

In the controller 50, robot data indicating, for example, the structure and action characteristics of the robot 12 and an area in the movable range of the robot 12, which is a tracking area where the robot 12 can track the workpiece W on the conveyor 11, is set in advance. Further, data concerning various positions indicating, for example, a relative position of the conveyor 11 and the robot 12, a relative position of the conveyor 11 and the camera 39, and a relative position of the robot 12 and the camera 39, workpiece data indicating the type and the shape of workpiece, and the like are set in the controller 50. The robot data, the data concerning the various positions, and the workpiece data are used for the driving control of the robot 12.

The controller 50 includes a user-program storing unit 51 that stores a user program and a user-program executing unit 52 that executes the user program stored in the user-program storing unit 51. The controller 50 further includes a workpiece-position storing unit 53 that stores an initial position of the workpiece W recognized by the camera 13 and a workpiece-position updating unit 54 that calculates a present position of the workpiece W, the initial position which is stored in the workpiece-position storing unit 53, on the basis of a moving distance of the conveyor 11. The controller 50 further includes a command-value generating unit 55 that generates a track of the workpiece section 32 (joint angles on the control axes C1 to C4), converts the track into a motor command value (a pulse), and outputs the motor command value to a motor control unit 57 explained later. Furthermore, the controller 50 includes a workpiece-target detecting unit 56 that detects the workpiece W, which is a workpiece target, from a positional relation between the tracking area and the workpiece W and the like and a motor control unit 57 that controls the motors 23, 27, 30, and 31 on the control axes C1 to C4 according to the motor command value from the command-value generating unit 55.

The user program stored in the user-program storing unit 51 (e.g., memory) is a computer program for executing various kinds of processing necessary for moving the workpiece section 32 of the robot 12 to track the workpiece W set as the workpiece target. Further, the user program is a computer program for executing various kinds of processing necessary for moving the workpiece W gripped by the workpiece section 32 to the predetermined position on the workbench 15.

The user-program executing unit 52 executes the user program. The user-program executing unit 52 treats, as a workpiece target, the workpiece W detected as the workpiece target from a detection result of the workpiece-target detecting unit 56. Further, the user-program executing unit 52 calculates information necessary for causing the robot 12 to, for example, track the selected workpiece W, calculates information necessary for moving the robot 12 to the target position, and communicates the calculated data to the command-value generating unit 55.

The position of the workpiece W being conveyed from a workpiece-position acquiring unit 58 explained later is input to the user-program executing unit 52 functioning as a target-position correcting unit. The position of the moving robot 12 calculated by a position calculating unit 60 is also input to the user-program executing unit 52. The user-program executing unit 52 corrects the target position of the robot 12 on the basis of the position of the workpiece W input from the workpiece-position acquiring unit 58 and the position of the robot 12 input from the position calculating unit 60, calculates information necessary for moving the robot 12 to the corrected target position, and communicates the calculated data to the command-value generating unit 55.

The workpiece-position updating unit 54 calculates the initial position of the workpiece W from the image of the workpiece W on the conveyor 11 picked up by the camera 13 and stores information concerning the initial position in the workpiece-position storing unit 53. On the other hand, the workpiece-position updating unit 54 calculates a conveying distance of the workpiece W by the conveyor 11 on the basis of the number of conveyor pulses obtained by integration of conveyor pulses input from the encoder 14. The workpiece-position updating unit 54 calculates a difference between the number of conveyor pulses during the image pickup (in the initial position) of the workpiece W and a present number of conveyor pulses and calculates a conveying distance from the initial position of the workpiece W according to a product of the difference between the numbers of pulses and a conveying distance per unit conveyor pulse set in advance. The workpiece-position updating unit 54 is configured to be capable of sequentially calculating the present position of the workpiece W conveyed on the conveyor 11 by adding the conveying distance of the workpiece W calculated as explained above to the initial position (a coordinate in an X axis direction) of the workpiece W calculated during the image pickup stored in the workpiece-position storing unit 53.

The workpiece-target detecting unit 56 compares the present position of the workpiece W and the tracking area at a predetermined execution period. When the present position of the workpiece W reaches (enters) the tracking area, the workpiece-target detecting unit 56 detects the workpiece W as the workpiece target. When the present position of the workpiece W exits the tracking area, the workpiece-target detecting unit 56 detects the workpiece W excluded from the workpiece target. The workpiece-target detecting unit 56 communicates a result of the detection to the user-program executing unit 52 and the command-value generating unit 55.

The command-value generating unit 55 generates, on the basis of input various data, a track for moving the robot 12 to the target position and calculates joint angles on the control axes C1 to C4 for the robot 12 to follow the track. The command-value generating unit 55 outputs the joint angles on the control axes C1 to C4 for causing the robot 12 to follow the track to the motor control unit 57 as target joint angles. In this embodiment, the motor control unit 57 controls one motor at a control period T and controls the motors at different timings. The motor control unit 57 according to this embodiment sequentially controls the motors 23, 27, 30, and 31 at a period T/n obtained by dividing the control period T by the number of control axes n (n is an integer equal to or larger than 1, in this embodiment, n=4) and sequentially outputs, at the period T/n, power outputs corresponding to the target joint angles of the motors output from the motors output from the command-value generating unit 55. Specifically, the controller 50 switches the motors, which are control targets, at the period T/n in the order of the first motor 23, the second motor 27, the hoisting motor 30, and the rotation motor 31.

Further, the controller 50 includes a workpiece-position acquiring unit 58 that acquires the position of the workpiece W at the time of the detection of the workpiece W by the detection sensor 35 and the position calculating unit 60 that calculates the position of the robot 12 at the time of the detection.

The workpiece-position acquiring unit 58 acquires position data of the workpiece W by subjecting image data input from the camera 39, which picks up, from below, an image of the workpiece W reaching the detection line FL, to image processing. The workpiece-position acquiring unit 58 calculates, through the image processing, a coordinate value of the center position of the workpiece W in an image pickup range of the camera 39 and outputs the coordinate value to the user-program executing unit 52.

The camera 39 is electrically connected to the trigger-signal generating unit 59 functioning as a command output unit. When the trigger signal serving as the command is input from the trigger-signal generating unit 59, the camera 39 picks up an image of the image pickup range of the camera 39 and outputs image data of the picked-up image to the workpiece-position acquiring unit 58.

When the workpiece W is detected by the detection sensor 35, the trigger-signal generating unit 59 generates the trigger signal serving as the command. The trigger-signal generating unit 59 outputs the generated trigger signal simultaneously to the camera 39 and a trigger-signal input unit 61 explained later.

The position calculating unit 60 functioning as a robot-position detecting device and a robot-position detecting unit is explained in detail.

As shown in FIG. 3, the position calculating unit 60 includes the trigger-signal input unit 61 functioning as a command detecting unit, a position-data input unit 62, and a data processing unit 63.

The trigger signal output by the trigger-signal generating unit 59 is input to the trigger-signal input unit 61. The trigger-signal input unit 61 detects a state of the trigger signal at a detection period for the trigger signal. The data processing unit 63 detects, at a detection period Ts (=T/n) obtained by dividing the control period T for the motors by the number of control axes n (in this embodiment, n=4), the state of the trigger signal detected by the trigger-signal input unit 61.

A first encoder 64, a second encoder 65, a third encoder 66, and a fourth encoder 67 that detect joint angles on the control axes C1, C2, C3, and C4 on the basis of absolute positions of the motors 23, 27, 30, and 31 are connected to the position-data input unit 62. The encoders 64 to 67 detect the joint angles corresponding thereto in every half time (=T/2) of the control period T for the motors, which is a communication time Td required for communication of the encoders and the position-data input unit 62 and outputs position data indicating the detected joint angles to the position-data input unit 62.

The position-data input unit 62 includes a determining unit 68 that determines whether input position data is normal. The position-data input unit 62 associates the position data input from the encoders 64 to 67 with a determination result of the determining unit 68 concerning the position data.

Figure 4:
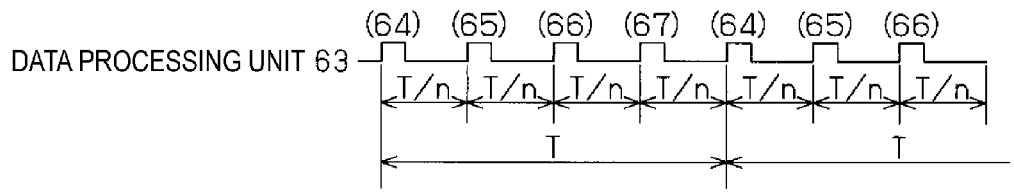
FIG. 4 is a timing chart showing timings when position data of encoders are acquired.

The data processing unit 63 acquires the position data input to the position-data input unit 62 and the determination result associated with the position data. If the data processing unit 63 acquires the position data corresponding to the respective encoders simultaneously from the position-data input unit 62, the data processing unit 63 needs to be configured to correspond to the position data. It is likely that the configuration of the data processing unit 63 is complicated. Therefore, a counter incremented at every period T/n is incorporated in the data processing unit 63. The counter indicates a count value corresponding to a control axis set as a control target. As shown in FIG. 4, the data processing unit 63 sequentially acquires the position data from the encoders 64 to 67 at every control period T such that a control axis indicated by a count value of the counter and a control axis corresponding to the position data input to the position-data input unit 62 match.

The position data from the encoders are input to the position-data input unit 62 through serial communication in the communication time Td. Therefore, the position data acquired by the data processing unit 63 is position data indicating a position detected by the encoders at a timing that is earlier than a timing when the position data are acquired by the communication time Td.

Figure 5:
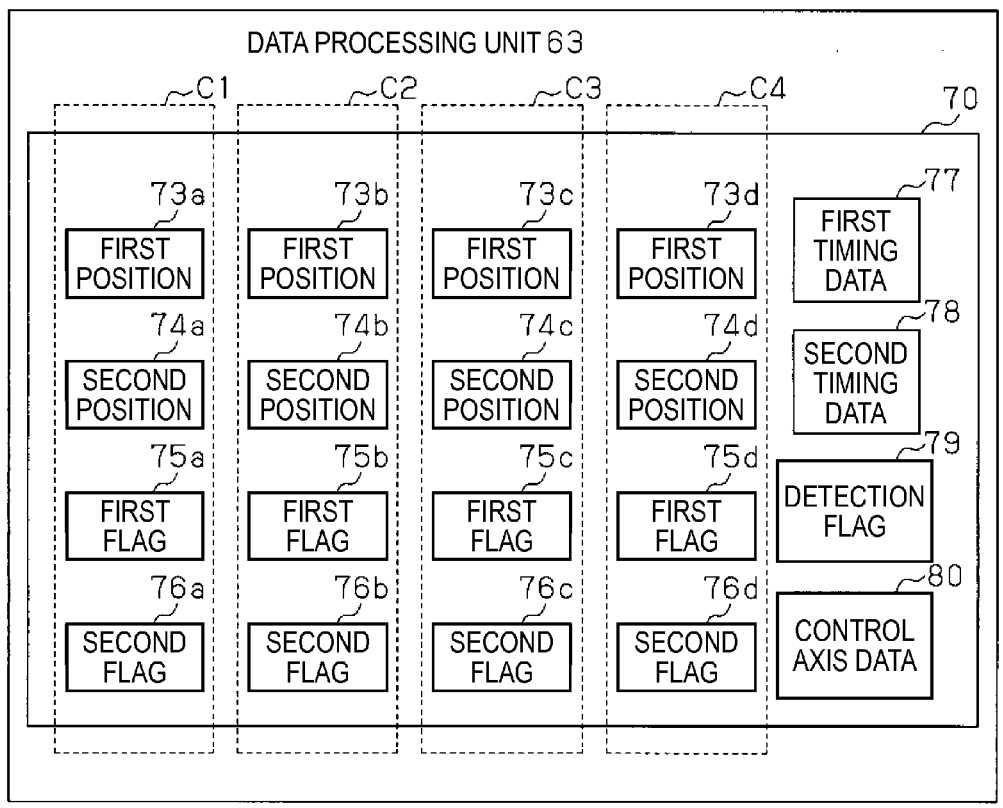
FIG. 5 is a diagram showing data stored by a storing unit of a data processing unit.

As shown in FIG. 5, the data processing unit 63 includes a storing unit 70 in which an area for storing various data concerning a joint angle on the control axis C1, joint angle on the control axis C2, a joint angle on the control axis C3, and a joint angle on the control axis C4 is provided in advance.

In this embodiment, among the timings when position data from an encoder is input to the position-data input unit 62, the next timing of the detection of the trigger signal is set as a reference timing in the encoder. In the storing unit 70, an area for storing a first position, which is position data acquired earlier than the reference timing, is provided for each of the control axes C1 to C4. A first position 73a is the position data input from the first encoder 64. A first position 73b is the position data input from the second encoder 65. A first position 73c is the position data input from the third encoder 66. A first position 73d is the position data input from the fourth encoder 67. Further, in the storing unit 70, an area for storing a second position, which is position data acquired later than the reference timing, is provided for each of the control axes C1 to C4. A second position 74a is the position data input from the first encoder 64. A second position 74b is the position data input from the second encoder 65. A second position 74c is the position data input from the third encoder 66. A second position 74d is position data input from the fourth encoder 67.

In the storing unit 70, concerning the position data indicating the first position, an area for storing, for each of the control axes C1 to C4, a first flag indicating whether the position data is normal is provided. A first flag 75a is associated with the position data input from the first encoder 64. A first flag 75b is associated with the position data input from the second encoder 65. A first flag 75c is associated with the position data input from the third encoder 66. A first flag 75d is associated with the position data input from the fourth encoder 67. Further, in the storing unit 70, concerning the position data indicating the second position, an area for storing, for each of the control axes C1 to C4, a second flag indicating whether the position data is normal is provided. A second flag 76a is associated with the position data input from the first encoder 64. A second flag 76b is associated with the position data input from the second encoder 65. A second flag 76c is associated with the position data input from the third encoder 66. A second flag 76d is associated with the position data input from the fourth encoder 67.

The data processing unit 63 determines, every time the data processing unit 63 acquires position data, whether the position data is normal. When the data processing unit 63 determines at a timing earlier than the reference timing that position data is normal, the data processing unit 63 updates the first position to the position data and sets the first flag to "0". On the other hand, when the data processing unit 63 determines at a timing earlier than the reference timing that position data is abnormal, the data processing unit 63 sets the first flag to "1" without updating the first position to the position data. The data processing unit 63 sequentially executes, on the control axes C1 to C4, the update of the first position and the setting of the first flag until the trigger signal is detected. When the trigger signal is detected, the data processing unit 63 stores the first positions and the first flags at the time of the detection in a predetermined area of the storing unit 70 as first timing data 77.

When the data processing unit 63 determines at a timing immediately after the reference timing that position data is normal, the data processing unit 63 updates the second position to the position data and sets the second flag to "0". On the other hand, when the data processing unit 63 determines at a timing immediately after the reference timing that position data is abnormal, the data processing unit 63 sets the second flag to "1" without updating the second position with the position data. The data processing unit 63 acquires position data at the next timing immediately after the reference timing and updates the second position to the position data irrespective of whether the position data is normal. When all the second positions are updated, the data processing unit 63 stores the second positions and the second flags in the predetermined area of the storing unit 70 as second timing data 78.

In the storing unit 70, an area for storing a detection flag 79 indicating whether the trigger signal is detected is provided. When the trigger signal is detected, the data processing unit 63 sets the detection flag 79 to "1". When a calculated position of the robot 12 is output to the user program executing unit 52, the data processing unit 63 sets the detection flag 79 to "0".

As shown in FIG. 5, in the storing unit 70, an area for storing control axis data 80, which is data indicating a control axis set as a control target at the time of the detection of the trigger signal, is provided. The data processing unit stores, on the basis of a count value of the counter incorporated therein, in the control axis data 80, data indicated by the control axis at the time of the detection of the trigger signal. Every time the trigger signal is detected, the data processing unit 63 calculates, on the basis of the first timing data 77, the second timing data 78, and the control axis data 80, joint angles on the control signals C1 to C4 at the time of the detection of the trigger signal and detects the position of the robot 12.

Figure 6:
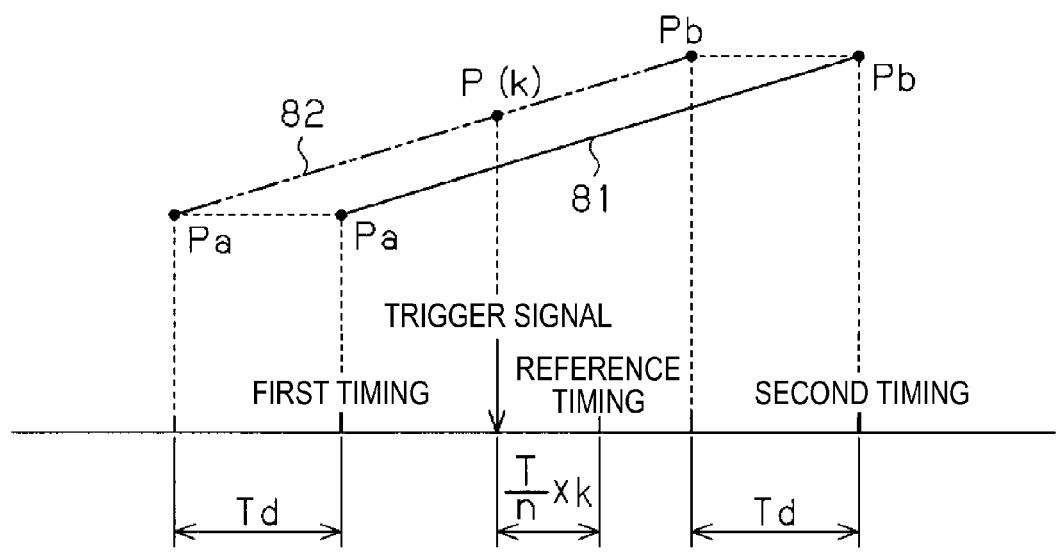
FIG. 6 is a diagram in which the position of the robot is associated with time and is an explanatory diagram for conceptually explaining a calculation process for calculating the position of the robot.

A calculation method for the position of the robot 12 by the position calculating unit 60 is explained with reference to FIG. 6. In FIG. 6, the first position, which is a joint angle at a first timing, is represented as Pa, the second position, which is a joint angle at a second timing, is represented as Pb, and a joint angle at the time of the detection of the trigger signal is represented as P(k). The communication time Td in this embodiment is a half time (=T/2) of the control period T for the motors.

When the second timing data 78 is stored, the data processing unit 63 selects, for each of the control axes C1 to C4, on the basis of a combination of the first flag and the second flag, one calculation formula out of four calculation formulas set in advance according to the combination. The data processing unit 63 substitutes the first position, the second position, and a constant k based on the control axis data 80 in the selected calculation formula to thereby calculate joint angles on the control axes C1 to C4 at the time of the detection of the trigger signal. The constant k is a constant determined for each control axis on the basis of a relation between a control axis set as a calculation target and a control axis set as a control target at the time of the detection of the trigger signal. With the period T/n set as a reference, a period from a timing when the trigger signal is detected until the reference timing is represented as "T/n×k" using the constant k.

For example, when the control target at the time of the detection of the trigger signal is the control axis C1 (the first motor 23), if the calculation target is the control axis C2 (the second motor 27), since the trigger signal is detected earlier than the reference timing concerning the second encoder 65 by the "period T/n", the constant k is "1". If the calculation target is the control axis C3 (the hoisting motor 30), since the trigger signal is detected earlier than the reference timing of the third encoder 66 by "2×period T/n", the constant k is "2". If the calculation target is the control axis C4 (the rotation motor 31), since the trigger signal is detected earlier than the reference timing by "3×period T/n", the constant k is "3". If the calculation target is the control axis C1 (the first motor 23), since the trigger signal is detected earlier than the reference timing by the control period T, the constant k is "4".

When both the first flag and the second flag of the control axis set as the calculation target is "0", i.e., the first timing and the reference timing are temporally apart from each other by the "control period T" and the reference timing and the second timing are apart from each other by the "control period T", the data processing unit 63 calculates a joint angle on the control axis at the time of the detection of the trigger signal using Formula (1) below.

$$P(k) = Pa + \frac{Pb - Pa}{T + T} \times \left(Td + T - \frac{T}{n}k\right) \quad (1)$$
$$= Pa + \frac{Pb - Pa}{4} \times \left(3 - \frac{2k}{n}\right)$$

When the first flag of the control axis set as the calculation target is "0" and the second flag of the control axis is "1", i.e., the first timing and the reference timing are temporally apart from each other by the "control period T" and the reference timing and the second timing are temporally apart from each other by "2×control period T", the data processing unit 63 calculates a joint angle on the control axis at the time of the detection of the trigger signal using Formula (2) below.

$$P(k) = Pa + \frac{Pb - Pa}{T + 2T} \times \left(Td + T - \frac{T}{n}k\right) \quad (2)$$
$$= Pa + \frac{Pb - Pa}{6} \times \left(3 - \frac{2k}{n}\right)$$

When the first flag of the control axis set as the calculation target is "1" and the second flag of the control axis is "0", i.e., the first timing and the reference timing are temporally apart from each other by "2×control period T" and the reference timing and the second timing are temporally apart from each other by the "control period T", the data processing unit 63 calculates a joint angle on the control axis at the time of the detection of the trigger signal using Formula (3) below.

$$P(k) = Pa + \frac{Pb - Pa}{2T + T} \times \left(Td + 2T - \frac{T}{n}k\right) \quad (3)$$
$$= Pa + \frac{Pb - Pa}{6} \times \left(5 - \frac{2k}{n}\right)$$

When both the first flag and the second flag of the control axis set as the calculation target are "1", i.e., the first timing and the reference timing are temporally apart from each other by "2×control period T" and the reference timing and the second timing are temporally apart from each other by "2×control period T", the data processing unit 63 calculates a joint angle on the control axis at the time of the detection of the trigger signal using Formula (4) below.

$$P(k) = Pa + \frac{Pb - Pa}{2T + 2T} \times \left(Td + 2T - \frac{T}{n}k\right) \quad (4)$$
$$= Pa + \frac{Pb - Pa}{8} \times \left(5 - \frac{2k}{n}\right)$$

Specifically, in Formulas (1) to (4), a joint angle at the time of the detection of the trigger signal is calculated by linear interpolation performed using position data at the first timing and position data at the second timing. An amount of change of the joint angle in a period of the communication time Td is calculated using a rate of change of the joint angle based on the linear interpolation. An actual joint angle at the time of the detection of the trigger signal is calculated by adding up the joint angle at the time of the detection of the trigger signal calculated by the linear interpolation and the amount of change of the joint angle in the period of the communication time Td.

More specifically, as shown in FIG. 6, the joint angle Pa is actually a joint angle at time earlier than the first timing by the communication time Td. The joint angle Pb is a joint angle at time earlier than the second timing by the communication time Td. Therefore, a straight line 81 shown by the linear interpolation indicates a joint angle in a period earlier than a period until the first timing or the second timing by the communication time Td. In other words, a straight line 82 obtained by translating the straight line 81 by a distance equivalent to the communication time Td indicates a relation between a joint angle acquired according to the first timing and the second timing and an actual timing when the joint angle is embodied. Therefore, since a difference between the straight line 82 and the straight line 81 is an amount of a change of the joint angle equivalent to the communication time Td at a rate of change of the joint angle, an actual joint angle at the time of the detection of the trigger signal is calculated by adding the amount of change of the joint angle to the joint angle indicated by the straight line 81. In other words, in the straight line 81 shown by the linear interpolation using the position data at the first timing and the position data at the second timing, a joint angle at a time later than the time of the detection of the trigger signal by the communication time Td is calculated as an actual joint angle at the time of the detection of the trigger signal.

A procedure of the processing to calculate the position of the robot in the data processing unit 63 having the configuration explained above is explained with reference to FIGS. 7 and 8. This processing is repeatedly executed.

Figure 7:
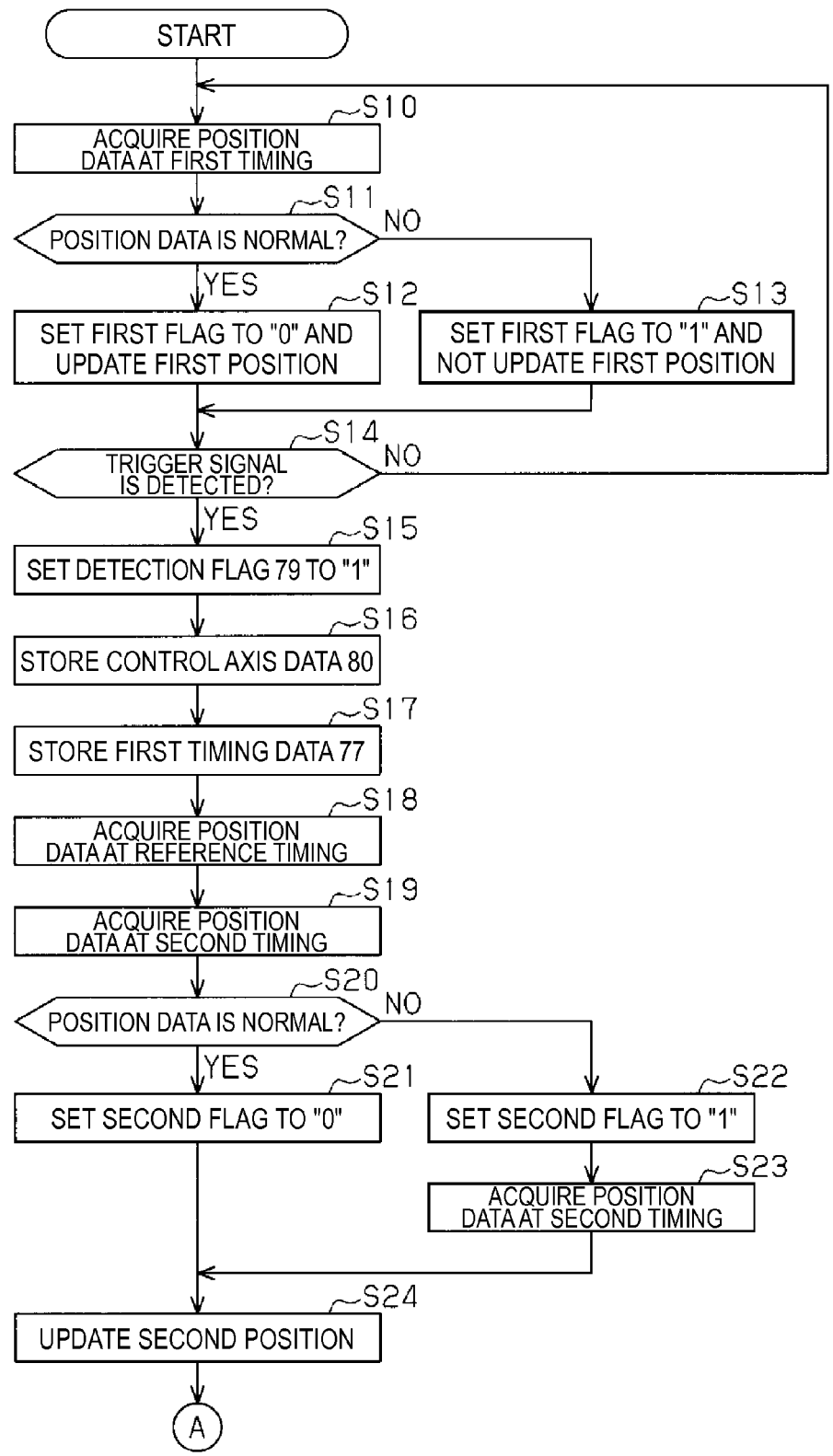
FIG. 7 is a flowchart showing a procedure of processing for calculating the position of the robot.

As shown in FIG. 7, first, concerning a control axis indicated by a count value of the incorporated counter, the data processing unit 63 acquires, as position data at the first timing, position data associated with a determination result of the determining unit 68 (step S10). Subsequently, the data processing unit 63 determines, on the basis of the position data acquired in step S10, whether the position data is normal (step S11).

When the data processing unit 63 determines in step S11 that the position data is normal (YES in step S11), the data processing unit 63 sets the first flag to "0" and updates the first position to the position data (step S12). The data processing unit 63 shifts to the next step S14. On the other hand, when the data processing unit 63 determines in step S11 that the position data is abnormal (NO in step S11), the data processing unit 63 sets the first flag to "1" and does not update the first position (step S13). The data processing unit 63 shifts to step S14.

In the next step S14, the data processing unit 63 determines whether the trigger signal is detected at the present detection timing via the trigger-signal input unit 61.

When the trigger signal is not detected in step S14 (NO in step S14), the data processing unit 63 shifts to step S10 again and acquires, via the position-data input unit 62, position data at the first timing concerning a control axis indicated next by a count value of the counter. In other words, the data processing unit 63 sequentially executes, on the control axes C1 to C4, the update of the first position and the setting of the first flag until the trigger signal is detected in step S14.

When the trigger signal is detected in step S14 (YES in step S14), the data processing unit 63 sets the detection flag 79 to "1" (step S15). The data processing unit 63 stores, on the basis of a count value of the counter, in the control axis data 80, data indicating a control axis at the time of the detection of the trigger signal (step S16). The data processing unit 63 stores data indicating states of the first positions and the first flags, which are stored at the time of the detection of the trigger signal, in the predetermined area of the storing unit 70 as the first timing data 77 (step S17).

Subsequently, the data processing unit 63 sequentially acquires position data of the control axes C1 to C4 at the reference timing (step S18). The data processing unit 63 sequentially acquires, as position data at the second timing, position data of the control axes at a timing immediately after the reference timing (step S19).

In the next step S20, the data processing unit 63 determines, on the basis of the position data acquired at the timing immediately after the reference timing, whether the position data are normal. Concerning the control axis, the acquired position data which is determined as normal in step S20, the data processing unit 63 sets the second flag to "0" (step S21) and then updates the second position to the acquired position data (step S24).

On the other hand, in the step S20 concerning the control axis, the acquired position data which is determined as abnormal, the data processing unit 63 sets the second flag to "1" (step S22). The data processing unit 63 acquires position data at the next timing as position data at the second timing (step S23). The data processing unit 63 updates the second position to the acquired position data while maintaining a state of the second flat at "1" (step S24).

Figure 8:
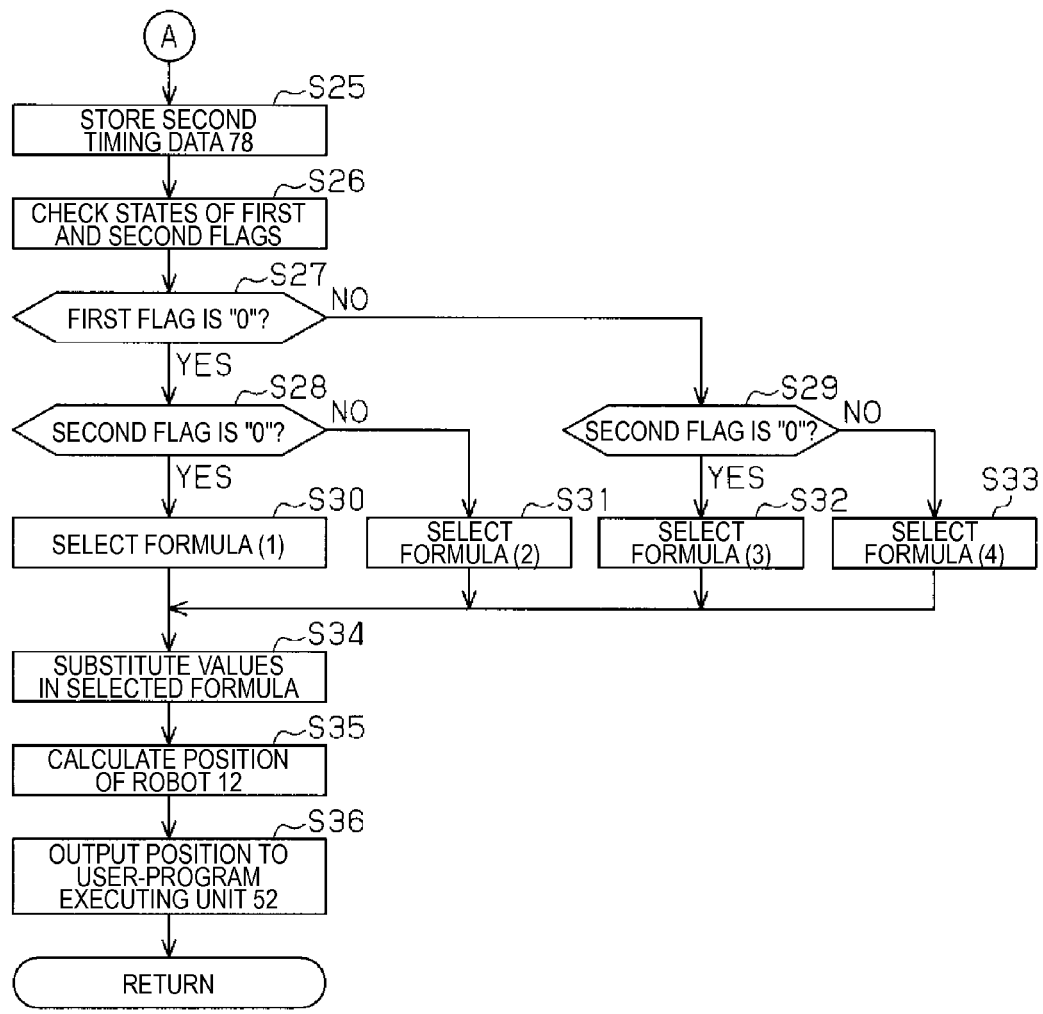
FIG. 8 is a flowchart showing the procedure of the processing for calculating the position of the robot.

As shown in FIG. 8, when the update of the second positions completely ends concerning the control axes C1 to C4, the data processing unit 63 stores data indicating states of the second positions and the second flags in the predetermined area of the storing unit 70 as the second timing data 78 (step S25).

When the second timing data 78 is stored, the data processing unit 63 checks states of the first and second flags concerning the control axes C1 to C4 (step S26). The data processing unit 63 selects calculation formulas according to the first and second flags. Specifically, concerning the control axis, both the first flag and the second flag which are "0" (YES in step S27 and YES in step S28), the data processing unit 63 selects Formula (1) (step S30). Concerning the control axis, the first flag which is "0" (YES in step S27) and the second flag which is "1" (NO in step S28), the data processing unit 63 selects Formula (2) (step S31). Concerning the control axis, the first flag which is "1" (No in step S27) and the second flag which is "0" (YES in step S28), the data processing unit 63 selects Formula (3) (step S32). Concerning the control axis, both the first flag and the second flag which are "1" (NO in step S27 and NO in step S28), the data processing unit 63 selects Formula (4) (step S33).

When the calculation formulas are selected for the control axes C1 to C4, the data processing unit 63 substitutes the constant k based on the first position, the second position, and the control axis data 80 in the selected formulas (step S34). Consequently, the data processing unit 63 calculates the position of the robot 12 indicated by joint angles on the control axes C1 to C4 (step S35). The data processing unit 63 outputs the calculated position of the robot 12 to the user-program executing unit 52 (step S36) to thereby set the detection flag 79 to "0" and then once ends the series of processing.

The action of the robot system 10 having the configuration explained above is now explained.

In the robot system 10 having the configuration explained above, the workpiece W conveyed by the conveyor 11 is selectively gripped by the robot 12. The workpiece W is detected by the detection sensor 35 when the workpiece W is being conveyed to the predetermined position on the workbench 15. In other words, the workpiece W is detected by the detection sensor 35 when the robot 12 is moved to the target position of the robot 12. When the workpiece W is detected, the position of the workpiece W at the time of workpiece detection is acquired on the basis of image data picked up by the camera 39. An actual position of the robot 12 at the time of the detection is calculated by the position calculating unit 60 on the basis of the positions of the robot 12 before and after the workpiece detection. The target position of the robot 12 is corrected on the basis of the position of the workpiece W and the actual position of the robot 12.

As explained above, with the robot system 10 according to this embodiment, effects such as those listed below can be obtained.

(1) The position calculating unit 60 according to the embodiment calculates, concerning each of the control axes, an actual joint angle at the time of the detection of the trigger signal by adding, to a joint angle at the time of the detection of the trigger signal acquired by linear interpolation using position data at the first timing and position data at the second timing, an amount of change of a joint angle in the communication time Td calculated using a rate of change of the joint angle based on the linear interpolation. In other words, concerning the joint angle acquired by the linear interpolation performed using the position data at the first timing and the position data at the second timing, a joint angle at a time later than the time of the detection of the trigger signal by the communication time Td is calculated as the actual joint angle at the time of the detection of the trigger signal. With such a configuration, even during the movement of the robot 12, it is possible to accurately detect joint angles on the control axes C1 to C4 at the time of the detection of the trigger signal. In other words, it is possible to accurately detect the position of the moving robot 12.

(2) The data processing unit 63 of the position calculating unit 60 acquires, at different timings, position data concerning a joint angle on the control axis C1, position data concerning a joint angle on the control axis C2, position data concerning a joint angle on the control axis C3, and position data concerning a joint angle on the control axis C4. The position calculating unit 60 calculates, concerning the control axes C1 to C4, actual joint angles at the time of the detection of the trigger signal. As a result, the joint angle on the control axis C1, the joint angle on the control axis C2, the joint angle on the control axis C3, and the joint angle on the control axis C4 are calculated. Therefore, it is possible to highly accurately detect an actual position of the robot at the time of the detection of the trigger signal.

(3) The position calculating unit 60 determines whether position data input to the position-data input unit 62 is normal and calculates joint angles on the control axes C1 to C4 using calculation formulas selected according to the determination. Consequently, it is possible to suppress the position of the robot 12 from being detected according to position data affected by a deficiency related to transmission of position data such as noise. As a result, it is possible to improve the accuracy of the position of the robot 12 detected by the position calculating unit 60.

(4) In the robot system, usually, it is extremely rare that the position data will continue to be determined to be abnormal. For example, position data is determined as abnormal when a deficiency occurs in a cable that connects the position-data input unit 62 and the encoders or in the encoders themselves. Therefore, if special processing is executed, for example, when abnormal data are continuously input to the position-data input unit 62 from the same encoder, a new component for executing the processing is separately necessary. It is likely that the configuration of the position calculating unit 60 is complicated. In this regard, in the embodiment, the position calculating unit 60 is configured on the premise that at least one of two continuous position data output from the same encoder is normal data. As a result, it is possible to more simply configure the position calculating unit 60.

(5) Since the position of the robot 12 is calculated using linear interpolation, as the first timing and the second timing are temporally further apart from each other, a large error may more easily occur between a calculated position of the robot 12 and an actual position of the robot 12. In this regard, in the position calculating unit 60, even when the first timing and the second timing are temporally furthest apart from each other, first position data is position data input at a timing immediately preceding the reference timing and second position data is position data input at a timing immediately following the reference timing. As a result, it is possible to improve the accuracy of the calculated position of the robot 12 as compared with the position of the robot 12 calculated on the basis of position data acquired earlier than the first timing and position data acquired later than the second timing.

(6) In the embodiment, the communication time Td is set to a half time of the control period T for the motors and a period at which the data processing unit 63 acquires position data from the encoders is set to the control period T for the motors. When an output period of the encoders is smaller than the communication time Td, in some case, the second timing is a timing earlier than a timing when the communication time Td elapses from the reference timing. In such a case, it is likely that the straight line 82 obtained by translating the straight line 81 shown in FIG. 6 by the communication time Td cannot be caused to correspond to a total period from the first timing to the reference timing and the position of the robot 12 immediately before the reference timing cannot be calculated. In this regard, in the embodiment, since the period at which the data processing unit 63 acquires position data from the encoders is the control period T larger than the communication time Td, it is possible to cause the straight line 82 obtained by translating the straight line 81 by the communication time Td in FIG. 6 to correspond to the total period from the first timing to the reference timing. As a result, it is possible to surely calculate the position of the robot 12 at the time of the detection of the trigger signal.

(7) In the robot system 10, it is possible to correct the target position of the robot 12 while moving the workpiece W. In other words, it is unnecessary to stop the robot 12 in order to acquire a correction amount of the target position. As a result, it is possible to suppress the throughput of the robot system 10 from decreasing.

(8) Moreover, the target position of the robot 12 is corrected on the basis of the actual position of the robot at the time of the detection of the trigger signal. Consequently, it is possible to arrange the workpiece W in the predetermined position on the workbench 15 at high accuracy.

The embodiment can also be appropriately changed and carried out as explained below.

As in the embodiment, the position calculating unit 60 can be applied to a robot system that detects the position of a robot while moving the robot.

As explained above, in the robot system, it is extremely rare that the position data will continue to be determined to be abnormal. Therefore, the position calculating unit 60 according to the embodiment is configured on the premise that at least one of two position data continuously acquired from the same encoder is normal position data. However, this configuration may be changed. The position calculating unit 60 may be configured on the assumption that abnormal position data are continuously input.

For example, in the data processing unit 63, a counter that counts, concerning position data at the first timing and position data at the second timing, the number of times an abnormality of the position data continues is provided for each of the control axes C1 to C4. The data processing unit 63 stores, as the position data at the first timing, normal position data acquired last time until normal position data is acquired. When normal data is acquired for the first time at a timing later than the reference timing as the position data at the second timing, the data processing unit 63 updates the second position to the position data. Under such a configuration, the data processing unit 63 calculates, on the basis of count values of the counters, a period from the first timing to the reference timing and a period from the reference timing to the second timing. It is desirable to perform linear interpolation on the basis of the calculated periods, the normal position data at the first timing, and the normal position data at the second timing and calculate the position of the robot 12 at the time of the detection of the trigger signal.

With the configuration explained above, when abnormal data are continuously acquired, it is possible to end the series of processing assuming that the accuracy of a calculated position of the robot 12 is low on the basis of count values of the counters. It is also possible to urge maintenance of the robot 12 by notifying a user that the abnormal position data are continuously acquired.

The position calculating unit 60 according to the embodiment may be configured not to calculate the position of the robot 12 at the time of the detection of the trigger signal when it is determined that position data acquired at a timing immediately before or immediately after the reference timing is abnormal.

The position calculating unit 60 according to the embodiment calculates joint angles on the control axes C1 to C4 respectively on the basis of position data input from the encoders having detection targets different from one another. However, the position calculating unit 60 is not limited to this. In the embodiment, for example, the position calculating unit 60 may calculate only a joint angle on the control axis C1 and a joint angle on the control axis C2. With such a configuration, since joint angles related to an X axis direction and a Y axis direction in the target position of the robot 12 are corrected, when workpiece such as disc-like workpiece is arranged, it is possible to reduce a load on the position calculating unit 60 if the direction of the workpiece is not regarded as important.

The trigger-signal input unit 61 according to the embodiment is configured to be capable of detecting the trigger signal at the detection period Ts (=T/n) obtained by dividing the control period T for the motors with the number of control axes n (n is an integer equal to or larger than 1, in this embodiment, n=4). However, the trigger-signal input unit 61 is not limited to this. The trigger-signal input unit 61 may be configured to be capable of detecting the trigger signal at a period shorter than the period T/n. With such a configuration, it is possible to reduce a difference between time the workpiece W is detected by the detection sensor 35 and time the trigger signal is detected by the data processing unit 63. Therefore, it is possible to more highly accurately calculate the position of the robot 12 at the time of the detection of the trigger signal. The trigger-signal input unit 61 may be configured to be capable of detecting the trigger signal at a period longer than the period T/n. With this configuration, the difference between the time the workpiece W is detected by the detection sensor 35 and time the trigger signal is detected by the data processing unit 63 is larger than that in the configuration explained above. The accuracy of a calculated position of the robot 12 is deteriorated. However, since the position of the robot 12 is calculated by the linear interpolation taking into account the communication time Td, it is possible to obtain a position closer to an actual position than a position obtained in the configuration for detecting the position of the robot 12 only with the position data from the encoders.

The position calculating unit 60 according to the embodiment calculates joint angles at the time of the detection of the trigger signal after determining whether the position data input from the encoders are normal. However, the position calculating unit 60 is not limited to this. The position calculating unit 60 may calculate joint angles without determining whether the position data are normal, for example, as long as reliability of the position data is sufficiently guaranteed. With such a configuration, since it is possible to omit the determining unit 68 of the position-data input unit 62, it is possible to further simplify the configuration of the position calculating unit 60.

The position calculating unit 60 according to this embodiment takes the opportunity of the detection of the trigger signal to calculate the position of the robot 12 at the time of the detection of the trigger signal. However, the position calculating unit 60 is not limited to this. For example, a timer that takes the opportunity of gripping of the conveyed workpiece W to start time measurement may be provided in the position calculating unit 60 to detect the position of the robot 12 when a predetermined time elapses after the workpiece W is gripped. In other words, a command for detecting the position of the robot 12 is not limited to be input from outside of the position calculating unit 60. The position calculating unit 60 may be configured to generate the command on the inside thereof on the basis of a control program set in advance.

In the embodiment, the timing immediately after the detection of the trigger signal is set as the reference timing based on the input of the trigger signal. However, the reference timing is not limited to this. The reference timing should merely be a timing specified by the detection of the trigger signal. For example, the detection time of the trigger signal may be set as the reference timing.

In the embodiment, the position calculating unit 60 functioning as the robot-position detecting device is embodied in the robot system 10 including the robot 12 of the horizontal multi-joint type having the four control axes. However, the robot-position detecting device is not limited to this. The robot-position detecting device can be embodied in a robot system including a robot that conveys the workpiece W. For example, the robot-position detecting device may be embodied in a robot system including a multi-joint robot having six control axes. Further, the terms grip and gripping do not necessarily mean grasped and include any ability to retain.

The entire disclosure of Japanese Patent Application No. 2011-047863, filed Mar. 4, 2011 is expressly incorporated by reference herein.

What is claimed is:

1. A robot-position detecting device comprising:
a position-data acquiring unit that acquires position data indicating actual positions of a robot;
a position-data input unit that receives the position data output from the position-data acquiring unit; and
a position calculating unit that calculates a computational position of the robot through linear interpolation using first and second position data input to the position-data input unit at different times,
wherein the position-data acquiring unit is an encoder provided in the robot;
the position calculating unit receives a command for detecting a position of the robot and calculates the computational position of the robot;
the first position data is data acquired at a timing earlier than the command;
the second position data is data acquired at a timing later than the command; and
the position calculating unit includes a command detecting unit that detects the command at a period Ts shorter than a predetermined period T for acquiring the position data input to the position-data input unit from one encoder.

2. The robot-position detecting device according to claim 1, wherein the position calculating unit acquires position data from different encoders at each period T/n obtained by equally dividing the predetermined period T by an integer n equal to or larger than 1 and outputs, for each of the encoders, a position of the robot at the time the command is input.

3. The robot-position detecting device according to claim 1, wherein
the position calculating unit determines whether the acquired position data is normal and, when the position calculating unit determines that the position data immediately before the detection of the command is not normal, the position calculating unit uses, as the first data, position data acquired immediately before the not normal position data was acquired.

4. The robot-position detecting device according to claim 3, wherein, when the position calculating unit determines that the position data immediately after the detection of the command is not normal, the position calculating unit uses, as the second position data, position data acquired immediately after the not normal position data was acquired.

5. A robot system comprising:
a robot that conveys a workpiece; and
a robot controller including a command output unit that outputs a command for detecting a position of the robot, the robot controller causing the robot to act, wherein
the robot system includes the robot-position detecting device according to claim 1.

6. A robot system comprising:
a robot that conveys a workpiece; and
a robot controller including a command output unit that outputs a command for detecting a position of the robot, the robot controller causing the robot to act, wherein
the robot system includes the robot-position detecting device according to claim 2.

7. The robot system according to claim 5, further comprising:
a camera that picks up, at a time when the command is input from the command output unit, an image of a predetermined image pickup range that includes the workpiece as it is being moved to a target position by the robot;
a workpiece-position acquiring unit that acquires the position of the workpiece based on the image acquired by the camera; and
a target-position correcting unit that corrects the target position based on the position of the workpiece acquired by the workpiece-position acquiring unit and the computational position of the robot calculated by the robot-position detecting device.

8. The robot system according to claim 6, further comprising:
a camera that picks up, at a time when the command is input from the command output unit, an image of a predetermined image pickup range that includes the workpiece as it is being moved to a target position by the robot;
a workpiece-position acquiring unit that acquires the position of the workpiece based on the image acquired by the camera; and
a target-position correcting unit that corrects the target position based on the position of the workpiece acquired by the workpiece-position acquiring unit and the computational position of the robot calculated by the robot-position detecting device.

* * * * *